United States Patent
Chien

(10) Patent No.: US 10,437,305 B2
(45) Date of Patent: Oct. 8, 2019

(54) POWER APPARATUS HAVING EXPANDABLE OUTLET AND OUTLET EXPANDING METHOD THEREOF

(71) Applicant: CYBER POWER SYSTEMS, INC., Taipei (TW)

(72) Inventor: Hung-Chun Chien, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 562 days.

(21) Appl. No.: 15/079,610

(22) Filed: Mar. 24, 2016

(65) Prior Publication Data
US 2017/0033559 A1    Feb. 2, 2017

(30) Foreign Application Priority Data
Jul. 28, 2015    (TW) .............................. 104124331 A

(51) Int. Cl.
| | |
|---|---|
| H02J 3/00 | (2006.01) |
| H01R 13/60 | (2006.01) |
| H01R 13/62 | (2006.01) |
| H02H 3/08 | (2006.01) |
| G06F 1/28 | (2006.01) |
| H02J 13/00 | (2006.01) |
| G06F 1/30 | (2006.01) |
| G06F 1/26 | (2006.01) |

(52) U.S. Cl.
CPC ................ *G06F 1/30* (2013.01); *G06F 1/266* (2013.01); *G06F 1/28* (2013.01)

(58) Field of Classification Search
CPC . H01R 3/00; H01R 13/627; G06F 1/00; H02J 3/00

USPC ...................................................... 307/11–42
See application file for complete search history.

(56) References Cited

U.S. PATENT DOCUMENTS

| | | | | |
|---|---|---|---|---|
| 5,157,273 | A | * | 10/1992 | Medendorp .......... H01R 25/003 307/116 |
| 7,672,104 | B2 | | 3/2010 | Reynolds et al. |
| 7,964,989 | B1 | | 6/2011 | Puschnigg et al. |
| 8,138,430 | B1 | * | 3/2012 | Ucero .................... H02G 3/128 174/480 |
| 8,639,459 | B1 | | 1/2014 | Morales et al. |
| 9,627,888 | B2 | * | 4/2017 | Ewing ....................... H02J 3/14 |
| 9,941,647 | B2 | * | 4/2018 | Huang ................. H01R 25/006 |
| 9,965,007 | B2 | * | 5/2018 | Amelio .................. H01R 24/78 |

(Continued)

FOREIGN PATENT DOCUMENTS

CN        103176433 A    6/2013

*Primary Examiner* — Brandon S Cole
(74) *Attorney, Agent, or Firm* — Bacon & Thomas, PLLC

(57) ABSTRACT

A power apparatus having expandable outlet and outlet expanding method thereof, the power apparatus comprises a plurality of outlets, a first processor and a first network interface; the first processor is electrically connected a switch, the first processor can determine whether the switch be in an expandable outlet mode or not, the first network interface electrically connected to the first processor; wherein the first processor can be provided with a first user interface, the first user interface can be provided with outlet information of each outlet, when the switch be in the expandable outlet mode, the first user interface can increase expanded outlet information of amount X under at least one of the outlet information, therefore at least one outlet can be provided with expandability.

11 Claims, 16 Drawing Sheets

(56) References Cited

U.S. PATENT DOCUMENTS

| | | | |
|---|---|---|---|
| 10,042,342 B1* | 8/2018 | Tyrrell | G01K 1/024 |
| 10,165,661 B2* | 12/2018 | Thijssen | H05B 37/0245 |
| 2005/0280970 A1* | 12/2005 | Reynolds | H02H 3/08 |
| | | | 361/93.1 |
| 2009/0215319 A1* | 8/2009 | Gandhi | H01R 13/7038 |
| | | | 439/654 |
| 2009/0236909 A1* | 9/2009 | Aldag | H01R 25/142 |
| | | | 307/39 |
| 2010/0079001 A1* | 4/2010 | Lee | G06F 1/266 |
| | | | 307/40 |
| 2011/0062780 A1 | 3/2011 | Verges et al. | |
| 2012/0317428 A1* | 12/2012 | Liu | H04L 12/12 |
| | | | 713/310 |
| 2015/0130276 A1* | 5/2015 | McNeill-McCallum | |
| | | | H02J 3/00 |
| | | | 307/23 |
| 2016/0162000 A1* | 6/2016 | Fujiwara | H02J 13/00 |
| | | | 713/340 |

\* cited by examiner

| # | Outlet Name | Device Name | Device URL |
|---|---|---|---|
| | 501 | 502 | 503 |
| 1 | Outlet 1 | Device 1 | http://www.cyberpower.com/..... |
| 2 | Outlet 2 | Device 2 | http://www.cyberpower.com/..... |
| ... 5n | | | |
| n | Outlet n | Device n | http://www.cyberpower.com/..... |
| 5n1 | | | |
| n-1 | External Outlet n-1 | External Device n-1 | N/A |
| n-2 | External Outlet n-2 | External Device n-2 | N/A |
| ... 5nx | | | |
| n-x | External Outlet n-x | External Device n-x | N/A |

FIG. 3

POWER APPARATUS HAVING EXPANDABLE OUTLET AND OUTLET EXPANDING METHOD THEREOF

BACKGROUND OF THE INVENTION

1. Field of the Invention

The invention relates to a power apparatus having expandable outlet and outlet expanding method thereof, and more particularly to enable at least one outlet of the power apparatus to become an expandable outlet, user can use a first user interface to increase outlet information of the power apparatus and save the outlet information, the power apparatus can be a PDU (Power Distribution Unit), a UPS (Uninterruptible Power Supply) or other power apparatus having a plurality of outlets.

2. Description of Related Art

A first prior-art is disclosed in U.S. Pat. No. 7,672,104, the first prior-art entitled "Current protection apparatus and method", the first prior-art disclosed a apparatus having changeable outlet status (e.g., click On/Off indication), setup scheduling and rename outlets, but the first prior-art has not been disclosed how to use an original outlet to become an expandable outlet to increase number of outlets, and the first prior-art has not been disclosed how to manage the expanded outlets. Thus, there is a requirement of improvement for the first prior-art.

A second prior-art is disclosed in U.S. Pat. No. 8,639,459, the second prior-art used a PDU power monitor module (108) to control and save IP address (Internet Protocol address) of each PDU. Each of rack systems can be provided with one or two PDUs more, but the second prior-art has not been disclosed how to use an original outlet to become an expandable outlet to increase number of outlets, and the second prior-art has not been disclosed how to manage the expanded outlets. Thus, there is a requirement of improvement for the second prior-art.

A third prior-art is disclosed in US Patent Application Publication No. US20110062780, the third prior-art used a USB cable (204) to connect a first PDU (202) and a second PDU (210), user can input command to each outlet (213) of the second PDU (210) by a touch screen (208), but the third prior-art has not been disclosed how to use an original outlet to become an expandable outlet to increase number of outlets, and the third prior-art has not been disclosed how to manage the expanded outlets. Thus, there is a requirement of improvement for the third prior-art.

SUMMARY OF THE INVENTION

It is therefore an object of the invention to provide a power apparatus having expandable outlet and outlet expanding method thereof, the power apparatus comprises a plurality of outlets, a first processor and a first network interface; the first processor is electrically connected a switch, the first processor can determine whether the switch be in an expandable outlet mode or not, the first network interface electrically connected to the first processor; wherein the first processor can be provided with a first user interface, the first user interface can be provided with outlet information of each outlet, when the switch be in the expandable outlet mode, the first user interface can increase expanded outlet information of amount X under at least one of the outlet information, therefore at least one outlet can be provided with expandability.

It is therefore another object of the invention to provide a power apparatus having expandable outlet and outlet expanding method thereof, the power apparatus comprises a first power equipment, a second power equipment and a management equipment; the first power equipment has a first user interface and a plurality of outlets, the second power equipment has a second user interface and a plurality of expanded outlets; the first power equipment and the second power equipment can communicate with the management equipment, the first user interface and the second user interface can be displayed on the management equipment; wherein the second user interface has an input field of IP Address (Internet Protocol address) and an input field of outlet serial number, therefore can appoint an address of the first power equipment and an outlet serial number of at least one of the outlets, the first user interface can increase expanded outlet information of amount X under at least one of outlet information.

First advantages of the invention is, the invention can use original outlet of a power equipment to expand the amount of outlet, and manage outlet information and expanded outlet information.

Second advantages of the invention is, the outlet information and the expanded outlet information can be saved to the power equipment, user or manager can use other device to read the outlet information and the expanded outlet information by a first network interface of the power equipment.

Third advantages of the invention is, the outlet information and the expanded outlet information are easy to manage, if the management equipment broke off communication or failure, the outlet information and the expanded outlet information will be not lost.

The above and other objects, features and advantages of the invention will become apparent from the following detailed description taken with the accompanying drawings.

BRIEF DESCRIPTION OF THE DRAWINGS

FIG. 3 is a first user interface diagram illustrating the first embodiment of the invention;

DETAILED DESCRIPTION OF THE INVENTION

Figure 1:
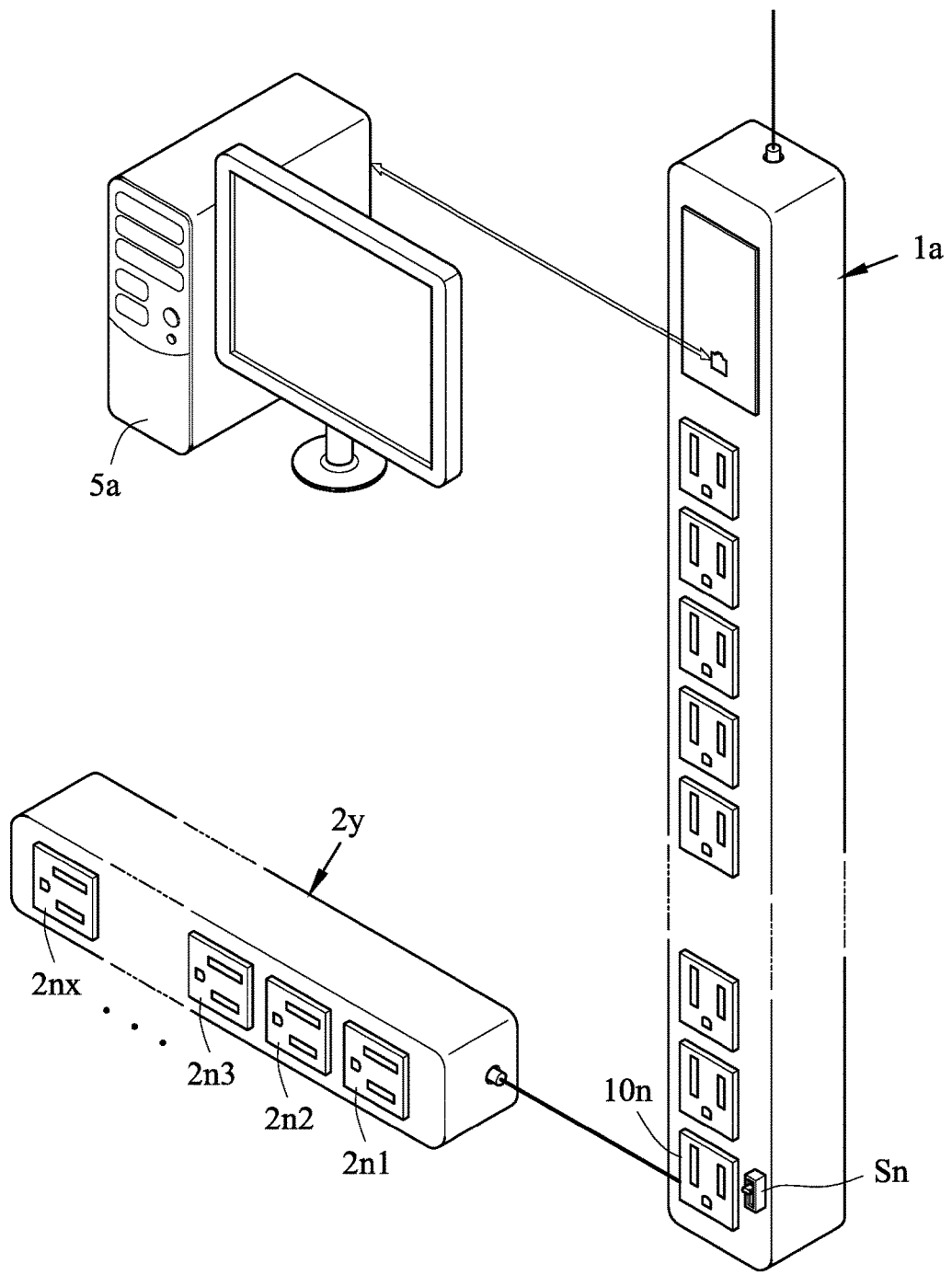
FIG. 1 is a perspective view showing a first preferred embodiment of the invention.
Figure 2:
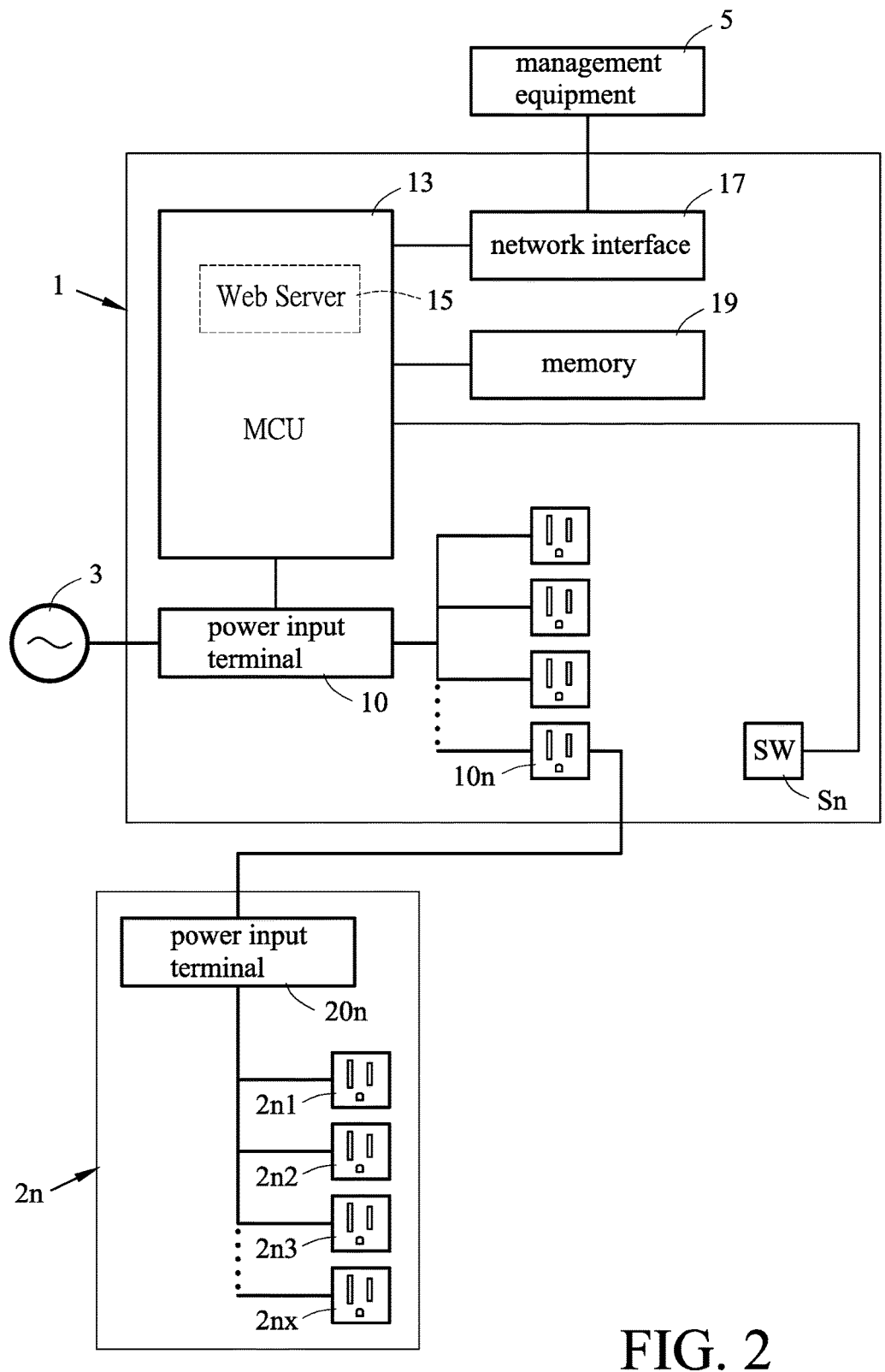
FIG. 2 is a functional block diagram illustrating the first embodiment of the invention.

Referring to FIGS. 1 to 3, a power apparatus 1,1a in accordance with a first embodiment of the invention comprises a first power input terminal 10, a plurality of outlets 10n, a first processor 13 and a first network interface 17; the first power input terminal 10 electrically connected to a power source 3, the plural outlets 10n connected in parallel to the first power input terminal 10, the first processor 13 is electrically connected a switch Sn, the first processor 13 can determine whether the switch Sn be in an expandable outlet mode or not, the first network interface 17 electrically connected to the first processor 13; wherein the first processor 13 can be provided with a first user interface 50, the first user interface 50 can be provided with outlet information 5n of the plural outlets 10n, when the switch Sn be in the expandable outlet mode, the first user interface 50 can increase expanded outlet information 5n1-5nx of an amount X under the N-th outlet information 5n, the first network interface 17 can communicate with a management equipment 5,5a, the first user interface 50 can be displayed on the management equipment 5,5a, and the expanded outlet information 5n1-5nx can be edited by the first user interface 50, therefore the switch Sn can control an expandability of the N-th outlet 10n.

Examples of an executing manner of the N-th outlet 10n, an expanded equipment 2n,2y can be plugged into the N-th outlet 10n; wherein the expanded equipment 2n,2y has a second power input terminal 20n and expanded outlets 2n1-2nx of an amount X, the expanded outlets 2n1-2nx connected in parallel to the second power input terminal 20n, the first user interface 50 can individually manage the plural outlets 10n and the expanded outlets 2n1-2nx by the plural outlet information 5n and the expanded outlet information 5n1-5nx.

Examples of a first storage manner of the outlet information and the expanded outlet information, the first processor 13 can electrically connect a first memory 19; the plural outlet information 5n and the expanded outlet information 5n1-5nx can be saved in the first memory 19; wherein the management equipment 5 can be provided with Web browser function, the first processor 13 can be a MCU (Microcontroller Unit) having function of a first server 15 (e.g., ARM-base MCU); the function of the first server 15 can select from Web server function, SNMP server function, Modbus server function or Telnet server function; the first network interface 17 can select from an Ethernet interface, an optical fiber network interface or a wireless network interface. User or manager can use other device (not shown) and the first network interface 17 to read the plural outlet information 5n and the expanded outlet information 5n1-5nx which be saved in the first memory 19. Thus, the invention is easy to manage, if the management equipment 5 broke off communication or failure, the plural outlet information 5n and the expanded outlet information 5n1-5nx will be not lost.

Figure 4:
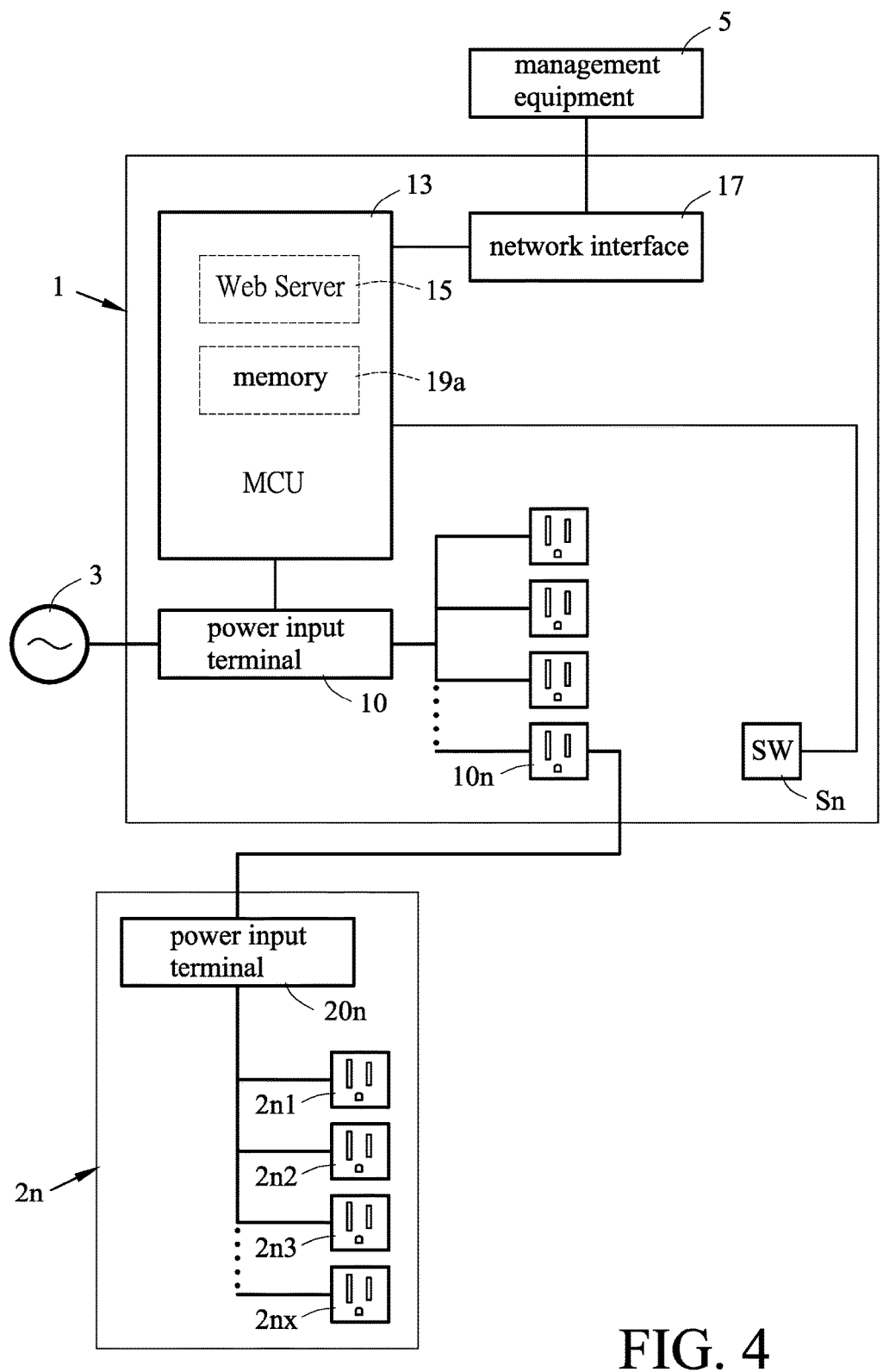
FIG. 4 is another functional block diagram illustrating the first embodiment of the invention.

Referring to FIGS. 3 to 4, examples of a second storage manner of the outlet information and the expanded outlet information, the first processor 13 has a first built-in memory 19a; the plural outlet information 5n and the expanded outlet information 5n1-5nx can be saved in the first built-in memory 19a. User or manager can use other device (not shown) and the first network interface 17 to read the plural outlet information 5n and the expanded outlet information 5n1-5nx which be saved in the first built-in memory 19a. Thus, the invention is easy to manage, if the management equipment 5 broke off communication or failure, the plural outlet information 5n and the expanded outlet information 5n1-5nx will be not lost.

Examples of an executing manner of the first user interface 50, the first user interface 50 has an outlet information page, the outlet information page has a plurality of fields, the plural fields can select from a field 501 of outlet serial number, a field 502 of outlet name or a field 503 of device name. The content of the field 501 of outlet serial number will be from "1" to "n", user can input the plural outlet information 5n by the management equipment 5; the content of the field 502 of outlet name can be inputted from "Outlet 1" to "Outlet n", or the content of the field 502 can be inputted other outlet name; the content of the field 503 of device name can be inputted from "Device 1" to "Device n", or the content of the field 503 can be inputted other device name. When the first user interface 50 increases expanded outlet information 5n1-5nx of an amount X, increased content of the field 501 of outlet serial number will be from "n-1" to "n-x", user can input the expanded outlet information 5n1-5nx by the management equipment 5; increased content of the field 502 of outlet name can be inputted from "Outlet n-1" to "Outlet n-x", or the increased content of the field 502 can be inputted other outlet name; increased content of the field 503 of device name can be inputted from "Device n-1" to "Device n-x", or the increased content of the field 503 can be inputted other device name.

Figure 5:
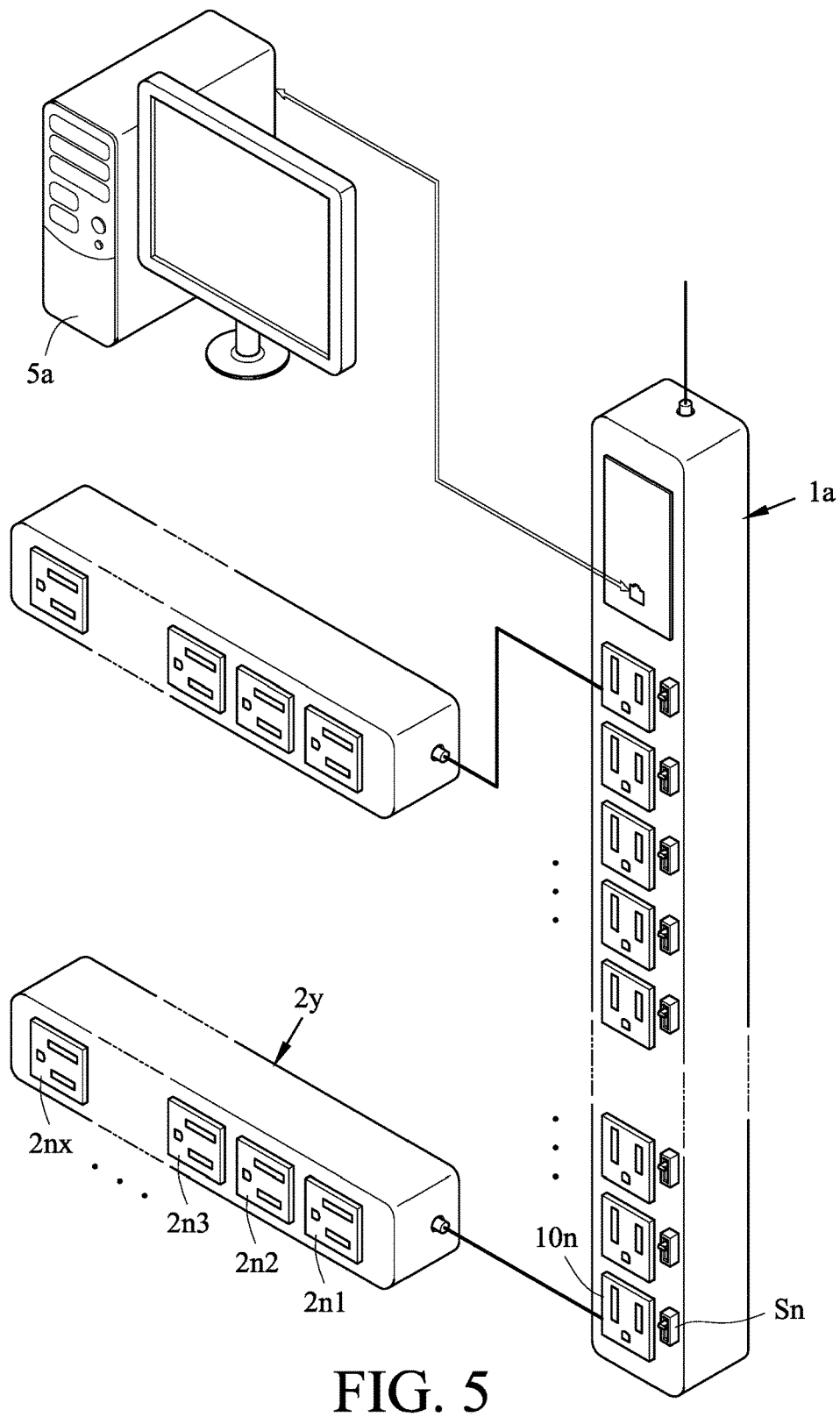
FIG. 5 is a perspective view showing a second embodiment of the invention.
Figure 6:
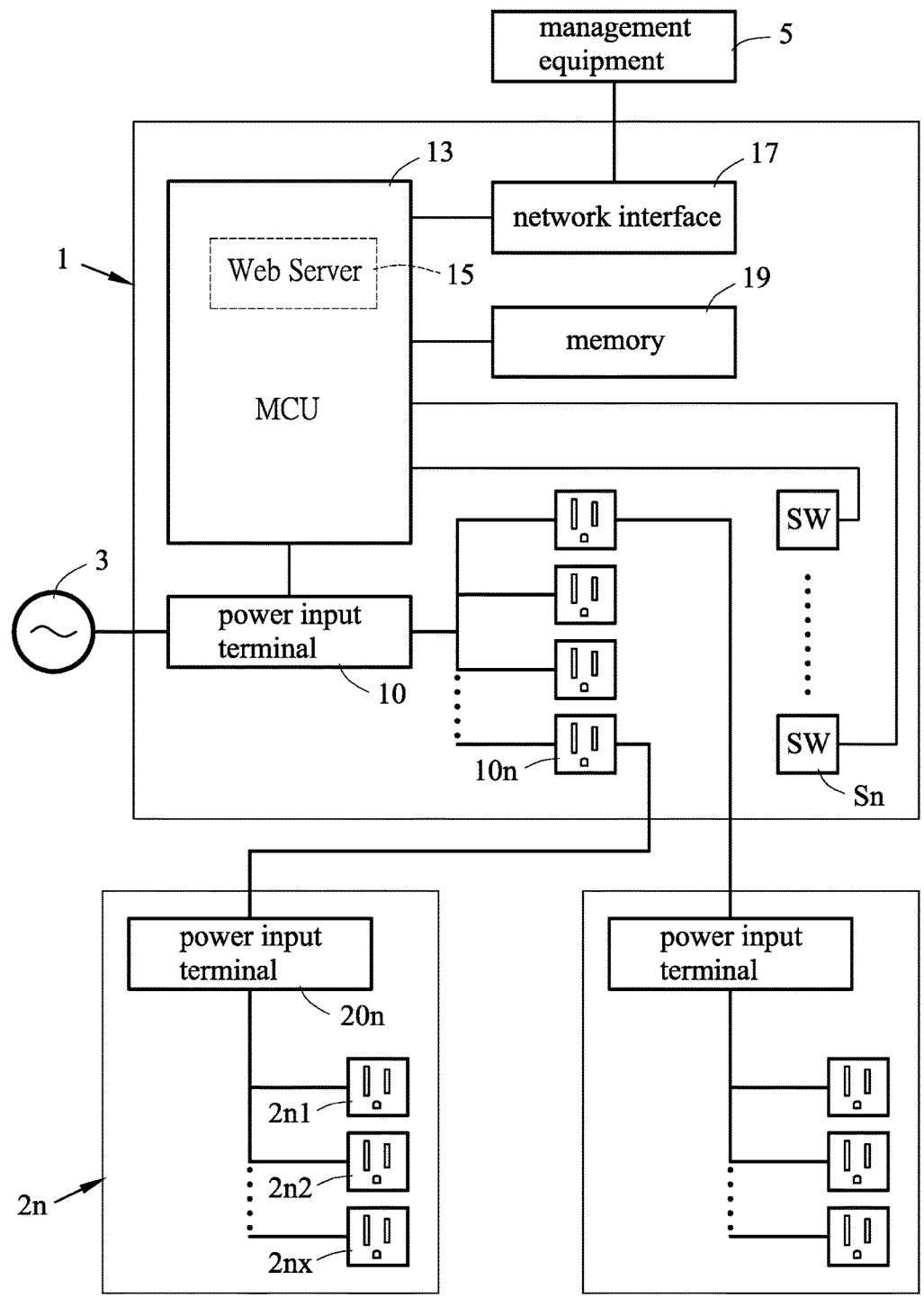
FIG. 6 is a functional block diagram illustrating the second embodiment of the invention.
Figure 7:
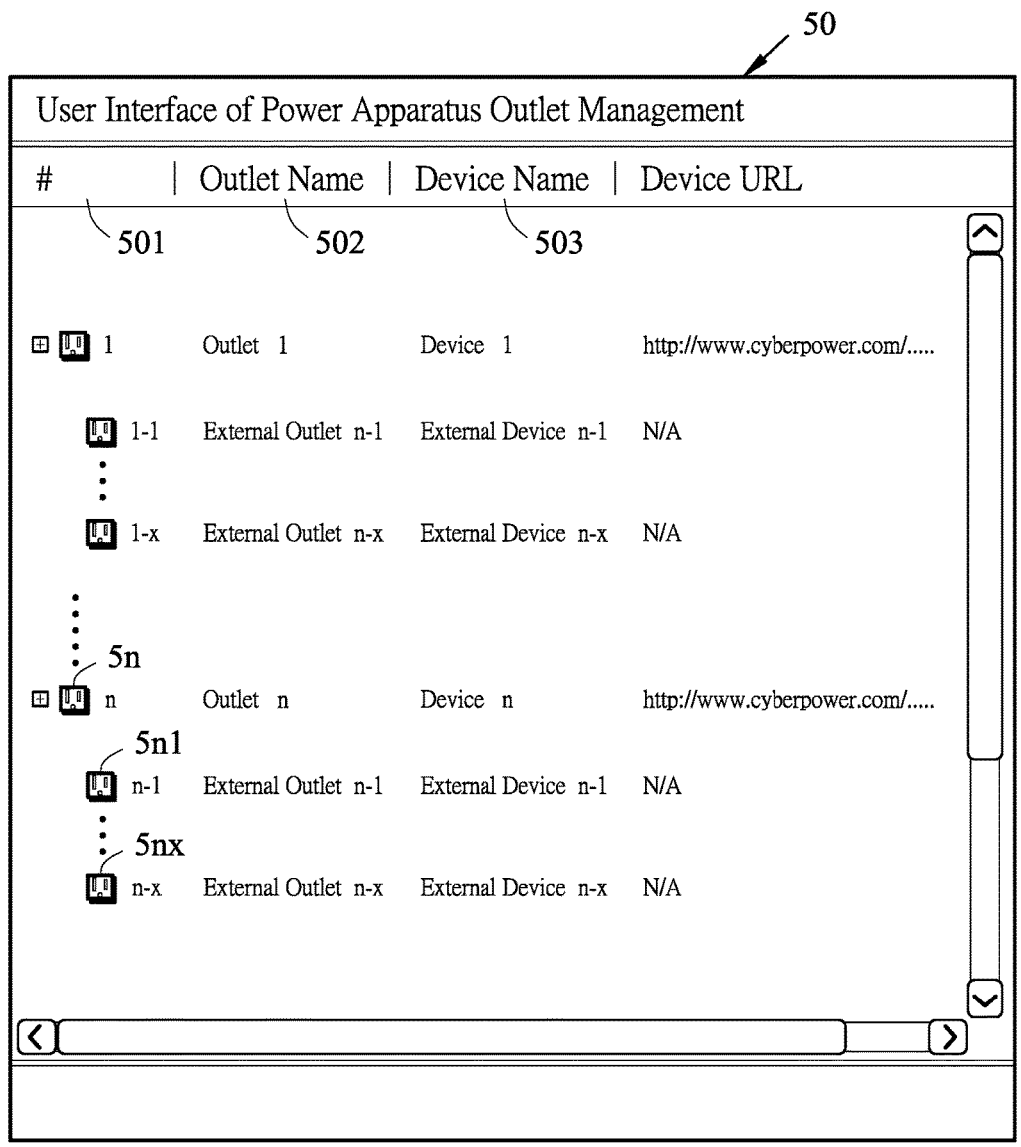
FIG. 7 is a first user interface diagram illustrating the second embodiment of the invention.
Figure 8:
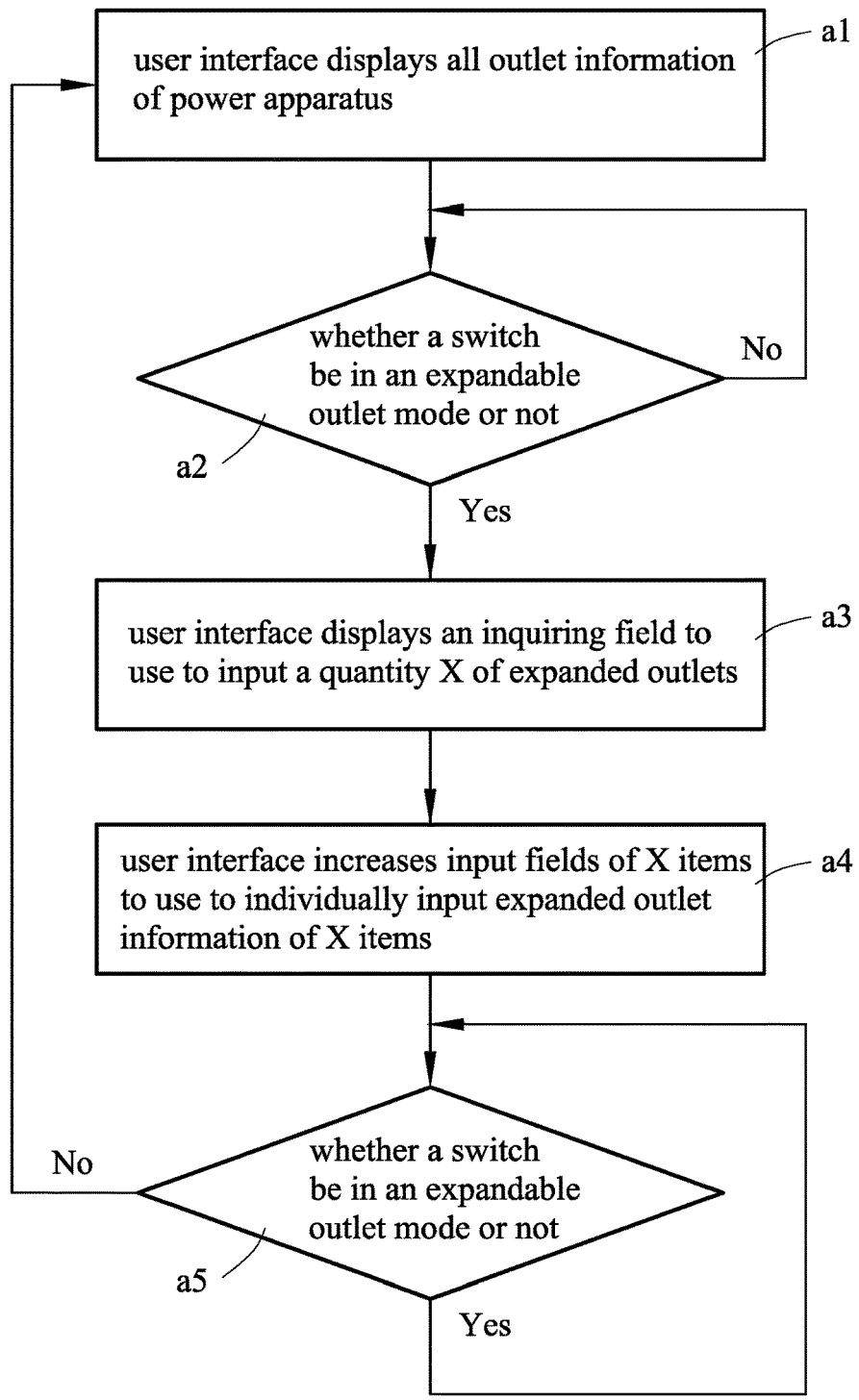
FIG. 8 is a flowchart of outlet expanding method illustrating the first preferred embodiment of the invention.
Figure 9:
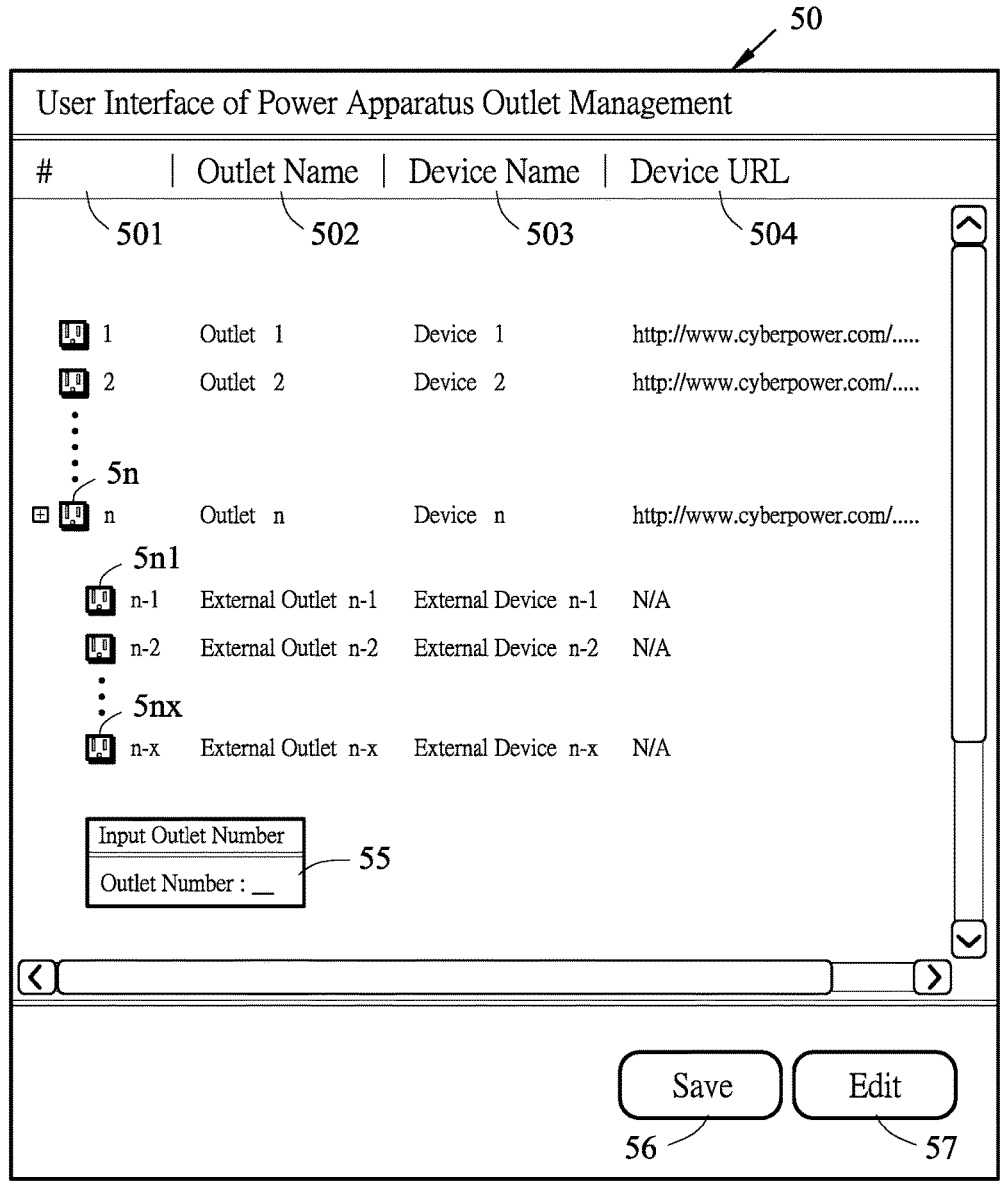
FIG. 9 is another first user interface diagram illustrating the first embodiment of the invention.
Figure 10:
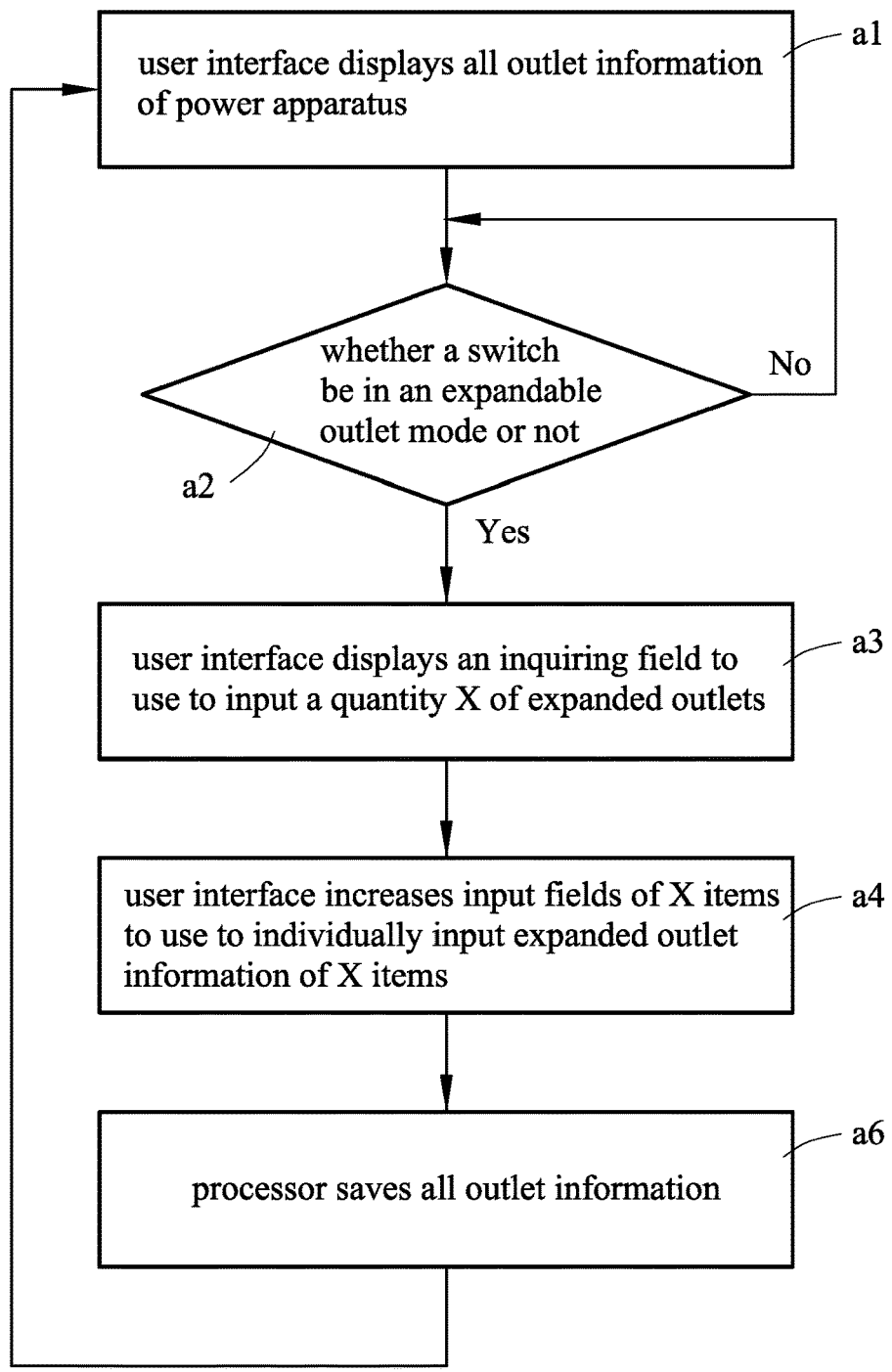
FIG. 10 is another flowchart of outlet expanding method illustrating the first preferred embodiment of the invention.

Referring to FIGS. 5 to 7, in a second embodiment of the invention, the first processor 13 is electrically connected a plurality of switches Sn, each switch Sn can be disposed on one side of each outlet 10n, the first processor 13 can determine whether each switch Sn be in an expandable outlet mode or not, the first user interface 50 can increase expanded outlet information 5n1-5nx under any outlet information 5n, therefore each switch Sn can control an expandability of each outlet 10n. Expanding manner of each outlet 10n can refer to description of the first embodiment.

Referring to FIGS. 8 to 9 and FIGS. 1 to 2, an outlet expanding method of the invention at least comprises a step a1, a first user interface 50 displays all outlet information of power apparatus 1,1a (when outlets have not been expanded, the outlet information are the plural outlet information 5n); a step a2, a first processor 13 of power apparatus 1,1a determines whether a switch Sn of power apparatus 1,1a be in an expandable outlet mode or not; if the determination is "NOT", that means the switch Sn has not been switched on the expandable outlet mode, the first processor 13 will re-determine until the determination is "YES", then execute next step; a step a3, the first user interface 50 displays an inquiring field 55 to use to input a quantity X of expanded outlets 2n1-2nx, and execute next step after the value X is inputted; a step a4, the first user interface 50 increases input fields of X items to use to individually input expanded outlet information 5n1-5nx of X items.

Examples of an attached step of the invention method, a step a5 can be executed after the step a4, the first processor 13 re-determines whether the switch Sn be in an expandable outlet mode or not; if the determination is "NOT", that means the switch Sn has closed the expandable outlet mode, then return to the step a1, the first user interface 50 displays all outlet information of power apparatus 1,1a (when outlets have expanded, the all outlet information are the plural outlet information 5n and the expanded outlet information 5n1-5nx); if the determination is "YES", that means the switch Sn is still switched to the expandable outlet mode, then the first processor 13 will re-determine.

Referring to FIGS. 9 to 10 and FIGS. 1 to 2, examples of another attached step of the invention method, a step a6 can be executed after the step a4, the first processor 13 saves all outlet information (when outlets have expanded, the all outlet information are the plural outlet information 5n and the expanded outlet information 5n1-5nx), and return to the step a1, the first user interface 50 displays all outlet information (when outlets have expanded, the all outlet information are the plural outlet information 5n and the expanded outlet information 5n1-5nx).

Examples of an executing manner of the first user interface 50, the first user interface 50 has an outlet information page, the outlet information page has a plurality of fields, the plural fields can select from a field 501 of outlet serial number, a field 502 of outlet name, a field 503 of device name or a field 504 of device URL (Uniform Resource Locator). Executing manner of fields 501-503 can refer to description of the first embodiment. The content of the field 504 of device URL can individually input a URL. When the inquiring field 55 of the first user interface 50 is inputted the value X, the first user interface 50 will increase input fields of X items, increased content of the field 501 of outlet serial number will be from "n-1" to "n-x", user can input the expanded outlet information 5n1-5nx by the management equipment 5; increased content of the field 502 of outlet name can be inputted from "Outlet n-1" to "Outlet n-x", or the increased content of the field 502 can be inputted other outlet name; increased content of the field 503 of device name can be inputted from "Device n-1" to "Device n-x", or the increased content of the field 503 can be inputted other device name; the field 504 of device URL can input URL of increased device.

Examples of an executing manner of the outlet information page, the outlet information page has a save button 56 and an edit button 57; when clicks the save button 56, the first processor 13 will enable all outlet information (when outlets have expanded, the all outlet information are the plural outlet information 5n and the expanded outlet information 5n1-5nx) to be saved in the first memory 19; when clicks the edit button 57, each of the outlet information can be re-inputted, or each of the outlet information can be edited (when outlets have expanded, the all outlet information are the plural outlet information 5n and the expanded outlet information 5n1-5nx).

Referring to FIGS. 8 to 9, FIG. 1 and FIG. 4, examples of another executing manner of the outlet information page, when clicks the save button 56, the first processor 13 will enable all outlet information (when outlets have expanded, the all outlet information are the plural outlet information 5n and the expanded outlet information 5n1-5nx) to be saved in the first built-in memory 19a.

Figure 11:
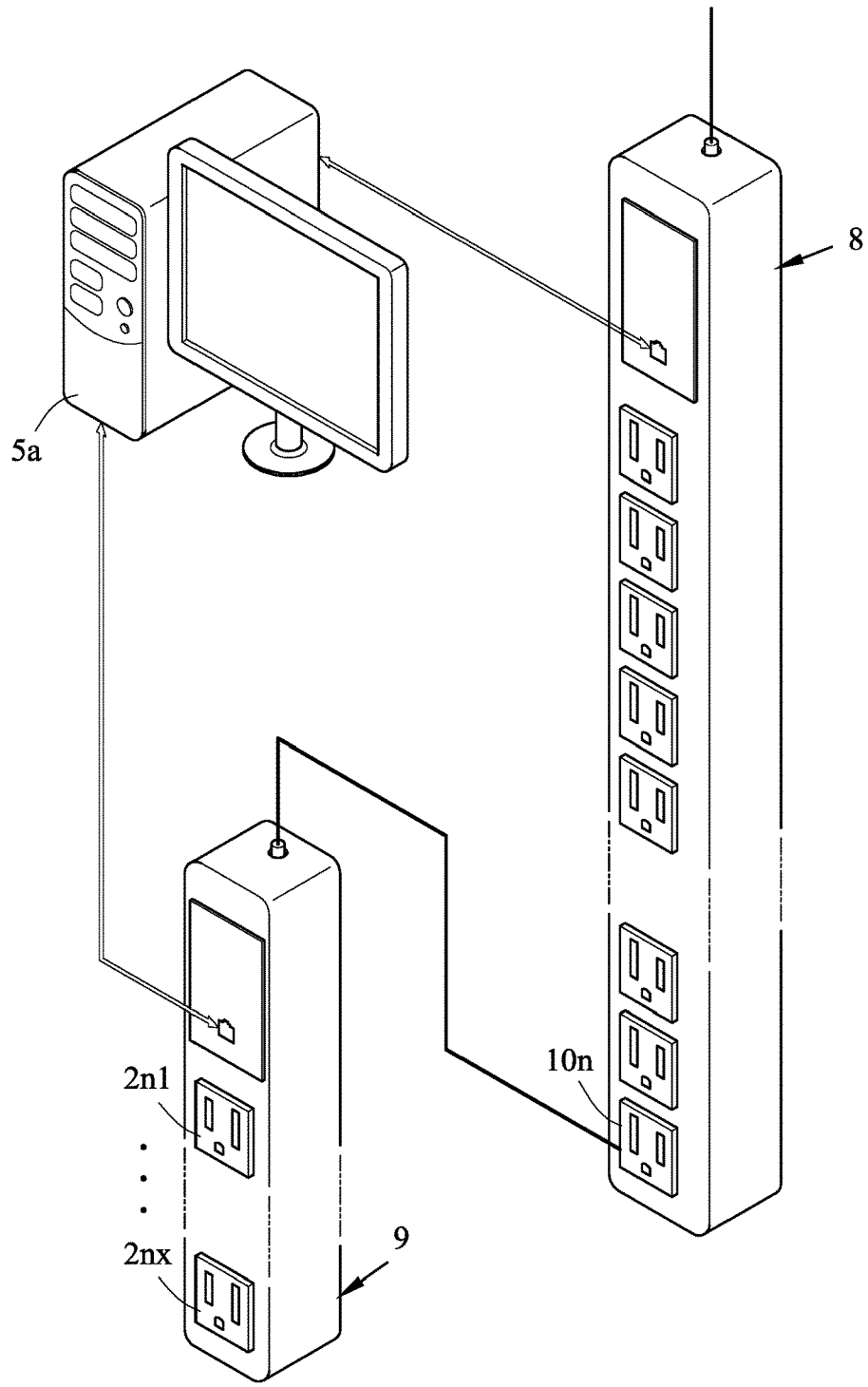
FIG. 11 is a perspective view showing a third embodiment of the invention.
Figure 12:
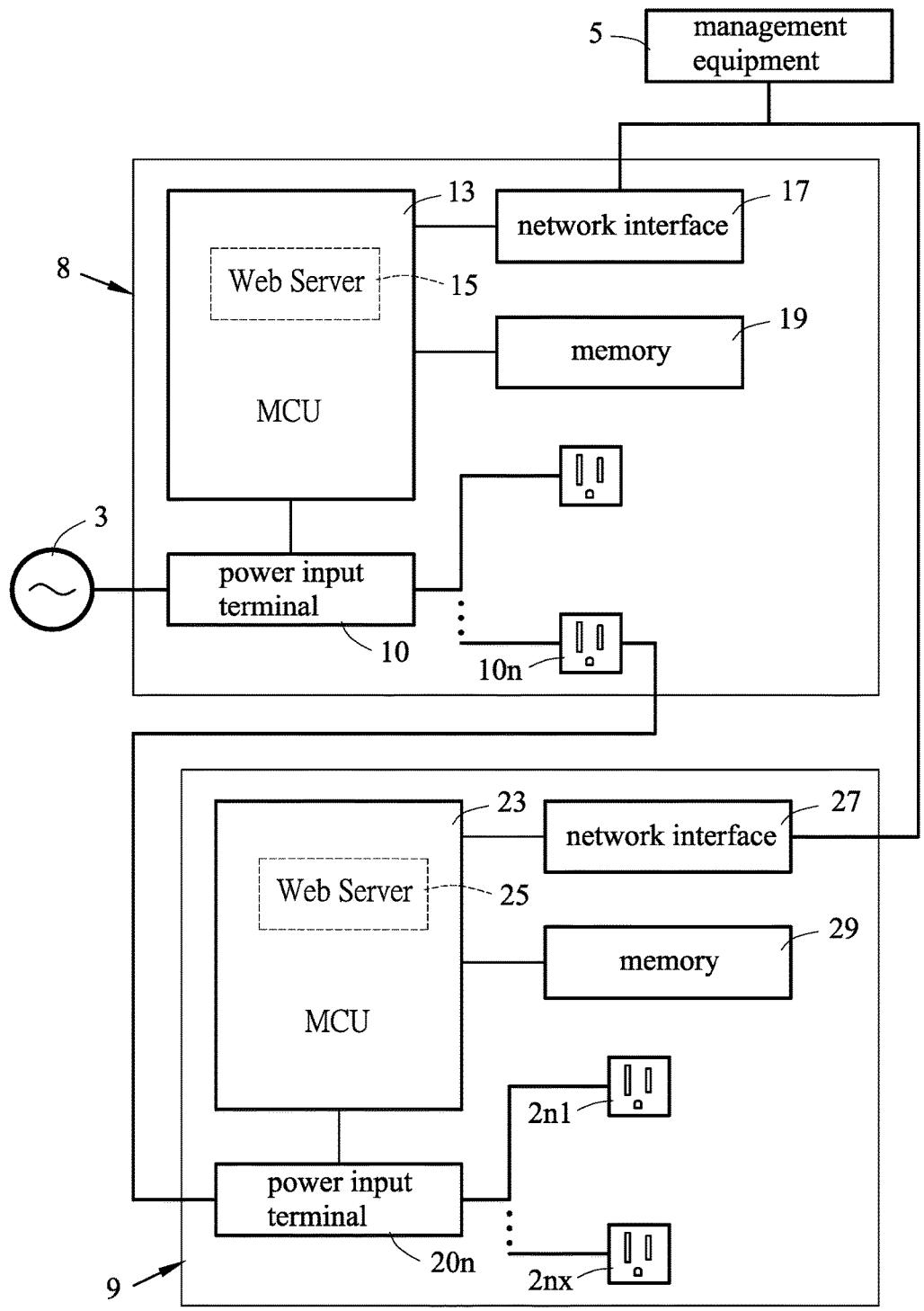
FIG. 12 is a functional block diagram illustrating the third embodiment of the invention.
Figure 13:
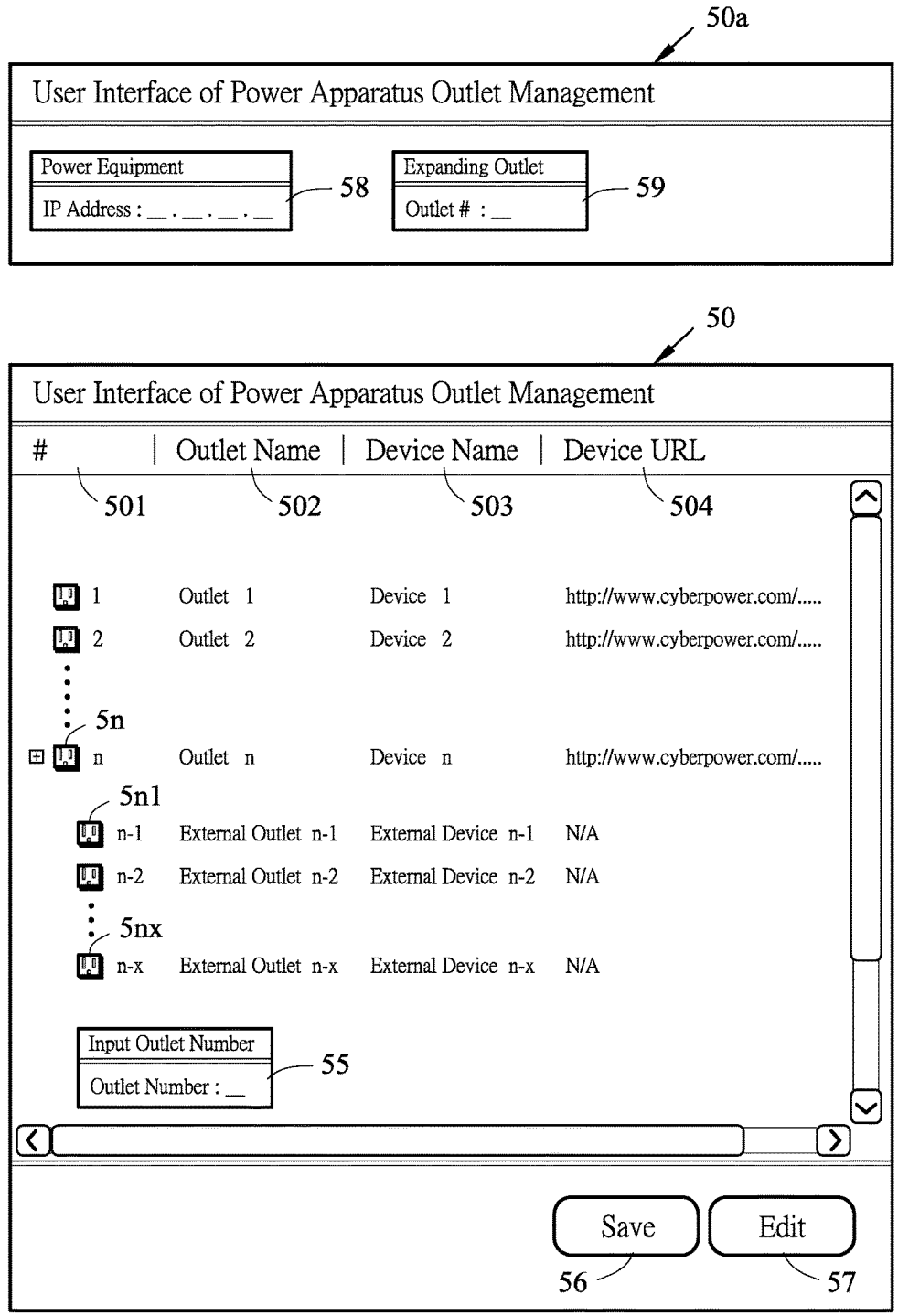
FIG. 13 is a diagram of first user interface and second user interface illustrating the third embodiment of the invention.
Figure 14:
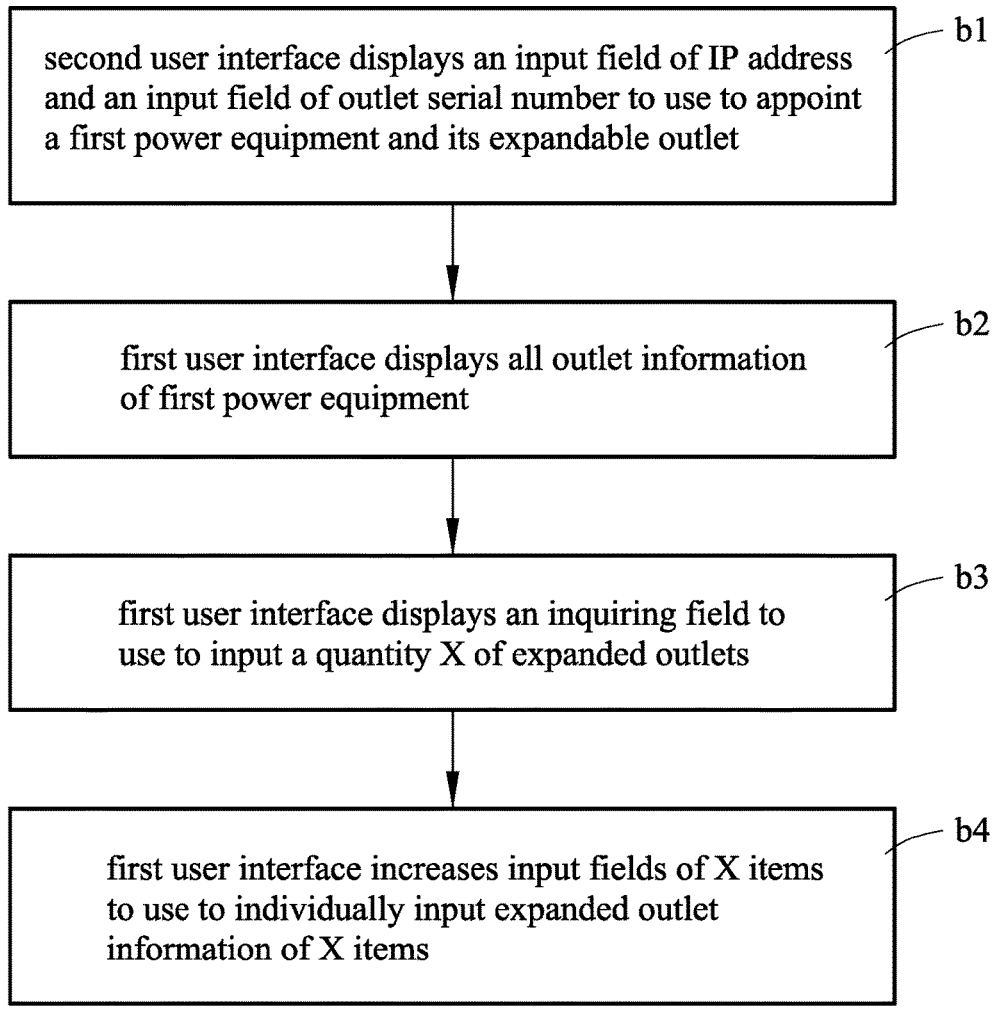
FIG. 14 is a flowchart of outlet expanding method illustrating the third embodiment of the invention.
Figure 15:
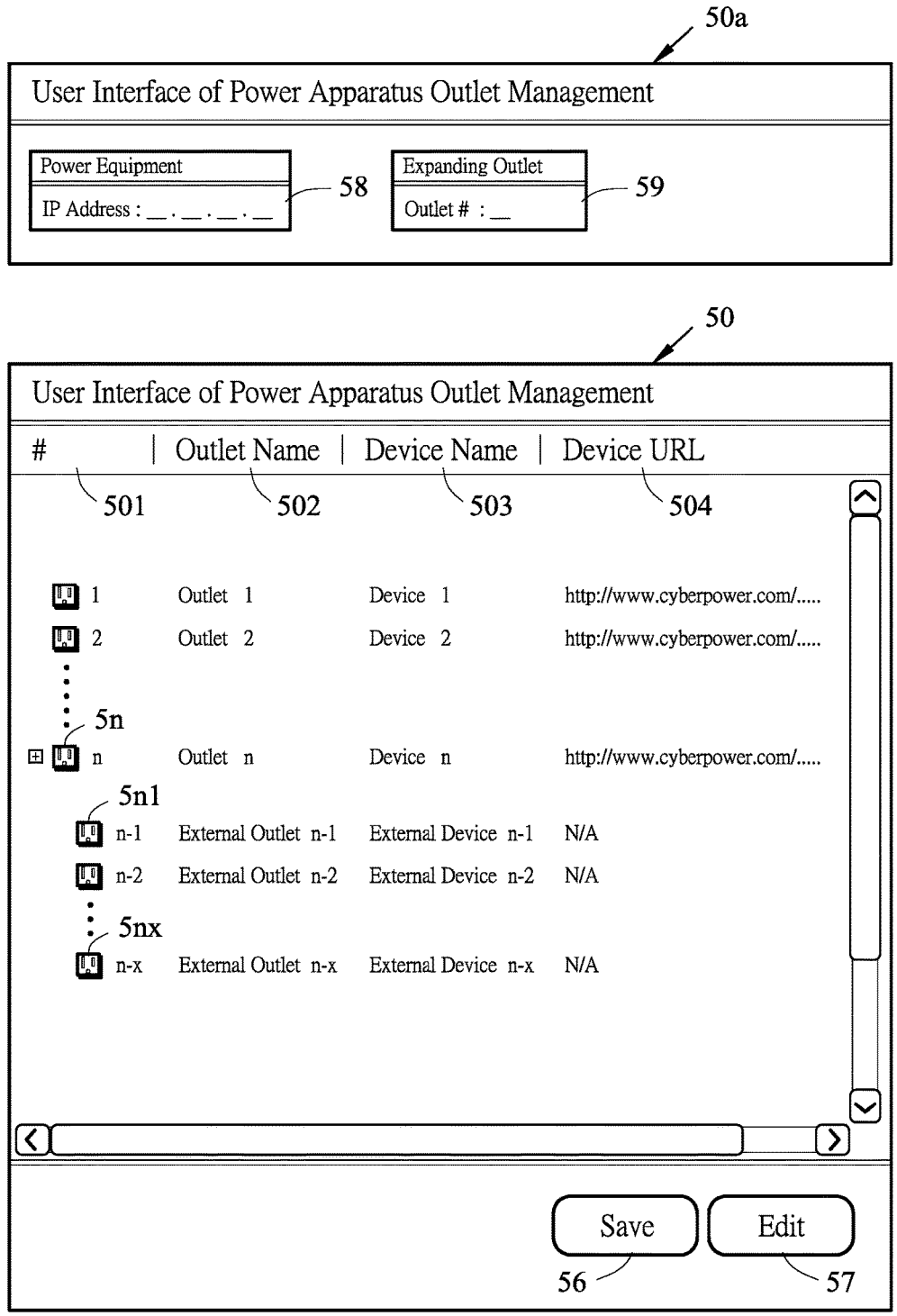
FIG. 15 is a diagram of first user interface and second user interface illustrating a fourth embodiment of the invention.
Figure 16:
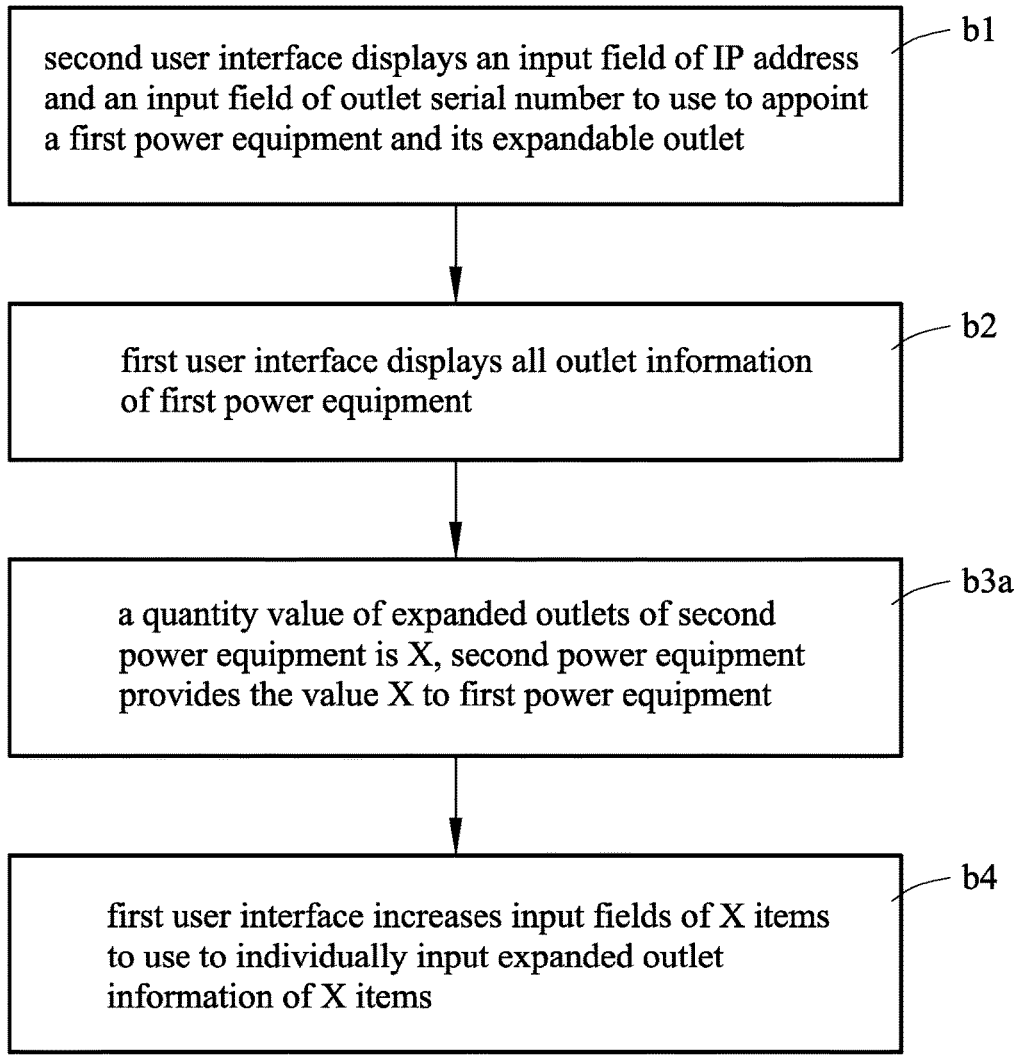
FIG. 16 is a flowchart of outlet expanding method illustrating the fourth embodiment of the invention.

Referring to FIGS. 11 to 13, in a third embodiment of the invention, power apparatus of the invention comprises a first power equipment 8, a second power equipment 9 and a management equipment 5,5a; the first power equipment 8 has a first power input terminal 10, a plurality of outlets 10n, a first processor 13 and a first network interface 17; the first power input terminal 10 electrically connected to a power source 3, the plural outlets 10n connected in parallel to the first power input terminal 10, the first processor 13 can be provided with a first user interface 50; the second power equipment 9 has a second power input terminal 20n, a plurality of outlets 2n1-2nx, a second processor 23 and a second network interface 27; the plural outlets 2n1-2nx connected in parallel to the second power input terminal 20n, the quantity of the plural outlets 2n1-2nx is X, the second processor 23 can be provided with a second user interface 50a; the management equipment 5,5a can communicate with the first network interface 17 and the second network interface 27; the first user interface 50 and the second user interface 50a can be displayed on the management equipment 5,5a; wherein the second user interface 50a has an input field 58 of IP address and an input field 59 of outlet serial number, therefore can appoint an address of the first power equipment 8 and outlet serial number of the N-th outlet 10n, the second power input terminal 20n electrically connected to the appointed N-th outlet 10n of the outlet serial number, the first user interface 50 has outlet information 5n of each outlet 10n, the first user interface 50 can increase expanded outlet information 5n1-5nx of an amount X under the N-th outlet information 5n.

Examples of an executing manner of the first processor 13 and the second processor 23, the first processor 13 can electrically connect a first memory 19, the second processor 23 can electrically connect a second memory 29, the plural outlet information 5n and the expanded outlet information 5n1-5nx can be saved in the first memory 19; wherein the first network interface 17 and the second network interface 27 can select from an Ethernet interface, an optical fiber network interface or a wireless network interface; the first processor 13 and the second processor 23 can be a MCU, the first processor 13 has function of a first server 15, the second processor 23 has function of a second server 25 (e.g., ARM-base MCU); the function of the first server 15 and the second server 25 can select from Web server function, SNMP server function, Modbus server function or Telnet server function.

Referring to FIGS. 11 to 14, in a third embodiment of the invention, an outlet expanding method of the invention at least comprises a step b1, a second user interface 50a displays an input field 58 of IP address and an input field 59 of outlet serial number to use to appoint a first power equipment 8, and appoint the N-th outlet 10n to be an expandable outlet; a step b2, a first user interface 50 displays all outlet information of first power equipment 8 (when outlets have not been expanded, the all outlet information are the plural outlet information 5n); a step b3, the first user interface 50 displays an inquiring field 55 to use to input a quantity X of expanded outlets 2n1-2nx, and execute next step after the value X is inputted; a step b4, the first user interface 50 increases input fields of X items to use to individually input expanded outlet information 5n1-5nx of X items.

Referring to FIGS. 11 to 12 and FIGS. 15 to 16, in a fourth embodiment of the invention, an outlet expanding method of the invention comprises a step b1, a second user interface 50a displays an input field 58 of IP address and an input field 59 of outlet serial number to use to appoint a first power equipment 8, and appoint the N-th outlet 10n to be an expandable outlet; a step b2, a first user interface 50 displays all outlet information of first power equipment 8 (when outlets have not been expanded, the all outlet information are the plural outlet information 5n); a step b3a, a quantity value of expanded outlets 2n1-2nx of a second power equipment 9 is X, the second power equipment 9 provides the value X to the first power equipment 8; a step a4, the first user interface 50 increases input fields of X items to use to individually input expanded outlet information 5n1-5nx of X items.

What is claimed is:

1. A power apparatus having expandable outlet, the power apparatus comprising:

a first power input terminal (10) electrically connected to a power source (3);
a plurality of outlets (10n) connected in parallel to the first power input terminal (10);
a first processor (13) electrically connected to a switch (Sn), the first processor (13) determining whether the switch (Sn) is in an expandable outlet mode or not; and
a first network interface (17) electrically connected to the first processor (13);
wherein the first processor (13) is provided with a first user interface (50), the first user interface (50) is provided with outlet information (5n) of the plural outlets (10n), and when the switch (Sn) is in the expandable outlet mode and a second power input terminal (20n) of an expanded equipment having X expanded outlets (2n1-2nx) is plugged into the N-th outlet (10n), the first user interface (50) is provided with expanded outlet information (5n1-5nx) that has been increased by an amount X under the N-th outlet information (5n), thereby enabling the N-th outlet (10n) to be provided with expandability and allowing the first user interface (50) to manage each of the plural outlets (10n) and each of the expanded outlets (2n1-2nx) by each of the plural outlet information (5n) and each of the expanded outlet information (5n1-5nx), wherein each of the expanded outlets (2n1-2nx) is connected in parallel to the second power input terminal (20n).

2. The power apparatus having expandable outlet of claim 1, wherein the first processor (13) electrically connects a first memory (19), the first processor (13) enables each of the plural outlet information (5n) and each of the expanded outlet information (5n1-5nx) to be saved in the first memory (19); and the first network interface (17) is selected from an Ethernet interface, an optical fiber network interface or a wireless network interface.

3. The power apparatus having expandable outlet of claim 1, wherein the first processor (13) electrically connects a first built-in memory (19a), the first processor (13) enables each of the plural outlet information (5n) and each of the expanded outlet information (5n1-5nx) to be saved in the first built-in memory (19a); and the first network interface (17) is selected from an Ethernet interface, an optical fiber network interface or a wireless network interface.

4. The power apparatus having expandable outlet of claim 1, wherein the first user interface (50) has an outlet information page, the outlet information page has a plurality of fields, and the plural fields are selected from a field (501) of outlet serial number, a field (502) of outlet name or a field (503) of device name or a field (504) of device URL (Uniform Resource Locator).

5. The power apparatus having expandable outlet of claim 1, wherein the first processor (13) is electrically connected a plurality of switches (Sn), each switch (Sn) is disposed on one side of each outlet (10n), the first processor (13) determines whether each switch (Sn) be in an expandable outlet mode or not, and the first user interface (50) increases the expanded outlet information (5n1-5nx) under each outlet information (5n).

6. The power apparatus having expandable outlet of claim 5, wherein each outlet (10n) can be plugged an expanded equipment, each expanded equipment has a second power input terminal (20n) and a plurality of expanded outlets (2n1-2nx), each of the expanded outlets (2n1-2nx) connected in parallel to the second power input terminal (20n).

7. An outlet expanding method of power apparatus, the method comprising the steps of:
a1) displaying all outlet information of a power apparatus by a first user interface (50);
a2) determining whether a switch (Sn) be in an expandable outlet mode or not by a first processor (13) of the power apparatus, if the determination is NOT, that means the switch (Sn) has not been switched on the expandable outlet mode, and the first processor (13) re-determines whether the switch (Sn) is in an expandable outlet mode or not until the determination is YES, and then execute next step;
a3) displaying an inquiring field (55) on the first user interface (50), which is used to input a quantity X of expanded outlets (2n1-2nx) of an expanded equipment having a second power input terminal (20n) being plugged into the N-th outlet (10n) of the power apparatus, and executing a next step after the value X is inputted, wherein each of the expanded outlets (2n1-2nx) is connected in parallel to the second power input terminal (20n);
a4) increasing input fields of X items on the first user interface (50), which is used to individually input expanded outlet information (5n1-5nx) of X items.

8. The outlet expanding method of power apparatus of claim 7, wherein a step a5 is executed after the step a4, in the step a5, the first processor (13) re-determines whether the switch (Sn) is in an expandable outlet mode or not; if the determination is NOT, that means the switch (Sn) has closed the expandable outlet mode, and the first processor (13) then returns to the step a1 and the first user interface (50) displays all outlet information; if the determination is YES, that means the switch (Sn) is still switched to the expandable outlet mode, and the first processor (13) will then re-determine whether the switch (Sn) is in an expandable outlet mode or not.

9. The outlet expanding method of power apparatus of claim 7, wherein a step a6 is executed after the step a4, in the step a6, the first processor (13) saves all outlet information and returns to the step a1, and the first user interface (50) displays all outlet information.

10. The outlet expanding method of power apparatus of claim 7, wherein the first user interface (50) has an outlet information page, the outlet information page has a plurality of fields, and the plural fields are selected from a field (501) of outlet serial number, a field (502) of outlet name, a field (503) of device name or a field (504) of device URL.

11. The outlet expanding method of power apparatus of claim 10, wherein the outlet information page has a save button (56) and an edit button (57); when a user clicks the save button (56), the first processor (13) enables all outlet information to be saved in a first memory (19) of the power apparatus or a first built-in memory (19a) of the first processor (13); and when the user clicks the edit button (57), each of the outlet information is enabled to be re-inputted, or each of the outlet information is enabled to be edited.

* * * * *